United States Patent [19]
Kaplan

[11] 3,894,241
[45] July 8, 1975

[54] WAVE ACTION POWER SOURCE

[76] Inventor: Saul Kaplan, 405 Highland Ave., Merion, Pa. 19066

[22] Filed: Mar. 8, 1974

[21] Appl. No.: 449,248

[52] U.S. Cl. .................................. 290/42; 290/53
[51] Int. Cl. ............................................. F03b 13/12
[58] Field of Search ................................ 290/42, 53

[56] References Cited
UNITED STATES PATENTS

| | | | |
|---|---|---|---|
| 163,451 | 5/1875 | Buckner | 290/42 X |
| 523,429 | 7/1894 | Johnson | 290/53 |
| 975,157 | 11/1910 | Quedens | 290/42 |
| 975,726 | 11/1910 | Sharpneck | 290/42 |
| 987,685 | 3/1911 | Atkinson | 290/42 |
| 1,393,472 | 10/1921 | Williams | 290/42 |
| 1,864,499 | 6/1932 | Grigsby | 290/42 |

*Primary Examiner*—B. Dobeck
*Attorney, Agent, or Firm*—Peter L. Tailer

[57] ABSTRACT

A power source which is powered by the energy in water waves has a frame which supports a shaft above the waves. A large number of floats are constrained by the frame to be moved up and down under the shaft by the waves. Above each float a first pulley having a first releasable rachet and a non-releasable rachet has a chain pass over it to hold a first weight at one end. On each float there is mounted a second pulley which engages the other end of the chain, the second pulley having a second releasable rachet. Each chain passes through a passage in a float to terminate at a second lighter weight. As waves move each float up, a second releasable rachet allows its second pulley to turn. As each float moves down, it pulls a chain about a first pulley raising a first weight, a first releasable rachet allowing its first pulley to turn and a non-releasable rachet allowing it to turn without rotating the shaft. As each first weight reaches a desired height, a means releases both releasable rachets to drop each first weight to turn the shaft by means of the first pulley and the non-releasable rachet. Sufficient floats and associated weights and apparatus ensure that the shaft will be constantly turned by falling weights to provide a power source.

5 Claims, 4 Drawing Figures

1

WAVE ACTION POWER SOURCE

BACKGROUND OF THE INVENTION

In this time of an energy shortage, vast energy could be made available by taking power from waves at beaches. While wave action power sources are known, this invention provides a simple, practical, and completely mechanical apparatus to harness the energy of the waves.

DESCRIPTION OF THE PREFERRED EMBODIMENT

Figure 1:
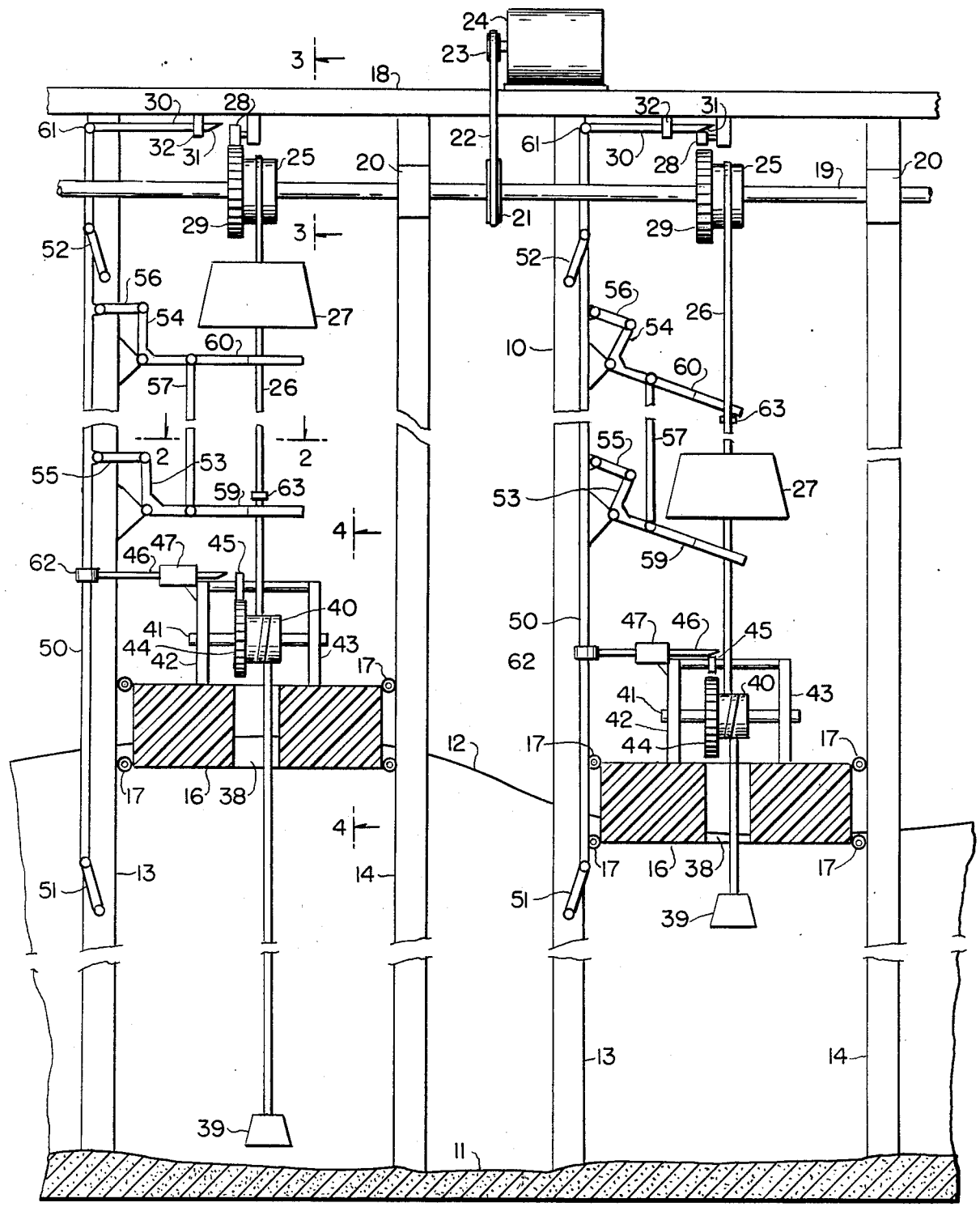
FIG. 1 is a front view of the apparatus of my invention with floats shown in vertical section and with horizontal portions broken away.
Figure 4:
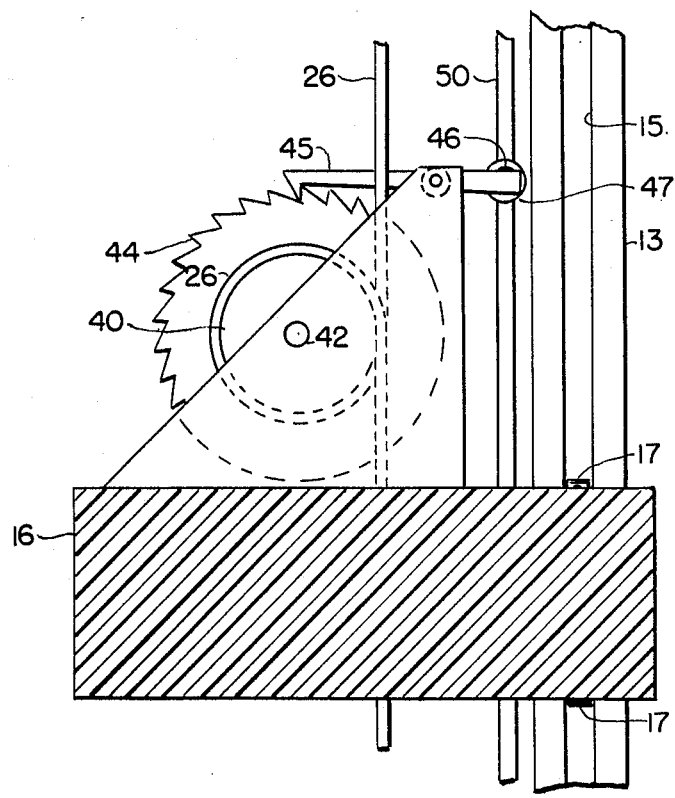
FIG. 4 is a vertical section taken on line 4—4 of FIG. 1.

As shown in FIG. 1, a frame 10 is set in the bottom 11 along a shore or other area where there is a suitable wave action. A wave 12 is shown. The frame 10 has horizontal portions broken away as it would be considerably higher both above and below the water than shown. Frame 10 has a large number of pairs of legs 13 and 14 each having an inward facing channel 15 as shown in FIG. 4. Between each pair of legs 13 and 14 a plastic float 16 is constrained by rollers 17 which engage the channels 15 to rise and fall on the waves 12. A top member 18 extends over and is fixed to the legs 13 and 14.

A shaft 19 is mounted by brackets 20 which project forward from the legs 14. A power takeoff pulley 21 on shaft 19 drives generator 24 by means of a belt 22 and a generator pulley 23. Also mounted on shaft 20 between each pair of legs 13 and 14 is a first pulley 25 which engages and has hung over it a chain 26. One end of each chain 26 has a heavy weight 27 fixed to it. A pawl 28 engages rachet 29 and a laterally slidable rod 30 with a tapered cam end 31 can be moved to release each rachet 29. A guide block 32 is transfixed by rod 30 to slidably mount it.

Figure 3:
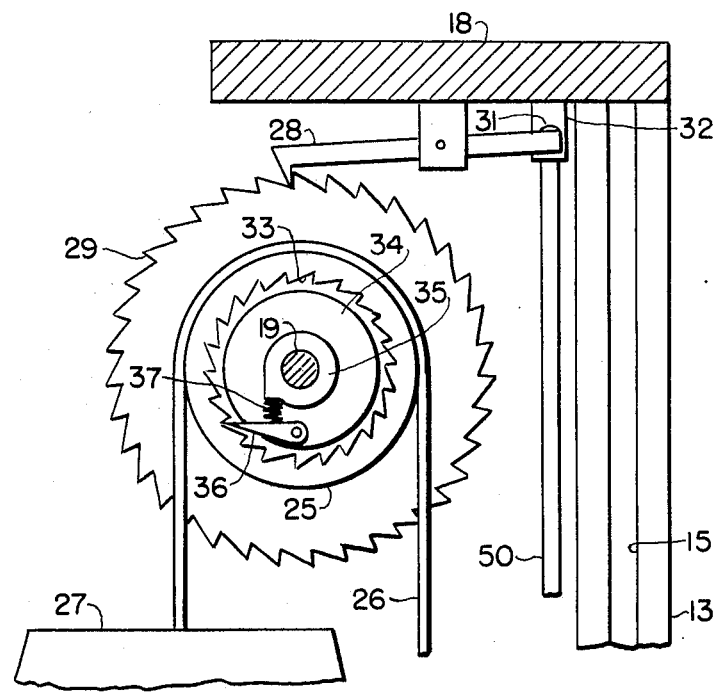
FIG. 3 is a vertical section taken on line 3—3 of FIG. 1.

As shown in FIG. 3, each pulley 25 and its rachet 29 are rotatably mounted on shaft 19. An internal rachet 33 is formed within pulley 25. A disk 34 and its hub 35 are fixed to shaft 19. A pawl 36 biased by compression spring 37 is pivotally mounted on disk 34 to engage the internal rachet 33.

As further shown in FIGS. 1 and 4, the other end of each chain 26 extends through a center passage 38 in a float 16 to terminate at the relatively light weight 39. Before passing through each passage 38, chain 26 engages and makes a turn about pulley 40 which is mounted on shaft 41 journalled in supports 42 and 43 mounted on each float 16. A rachet 44 on each pulley 40 is engaged by a pawl 45 which may be released by moving a laterally slidable rod 46 which is held in a guide 47 fixed to support 42.

Figure 2:
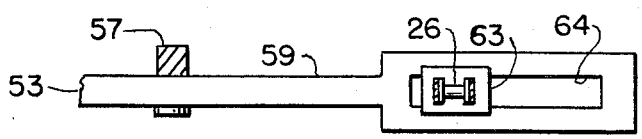
FIG. 2 is a horizontal section taken on line 2—2 of FIG. 1.

As may be seen in FIG. 1, a vertical pawl release rod 50 is mounted on each leg 13 by the pivotal links 51 and 52 so that the rod 50 may move laterally. Two bell cranks 53 and 54 are mounted on each leg 13 and connected by links 55 and 56 to rod 50. A link 57 connects the inward extending arms 60 and 59 of the bell cranks 54 and 53 so that the bell cranks are constrained to move together and rod 50 is constrained to remain vertical as it moves from side to side. The upper end of rod 50 is directly connected to pawl release rod 30 at 61. Pawl release rod 46 terminates in a ring 62 which rides on rod 50 and slides up and down along it as waves lift and drop the floats 16. A cam block 63 is mounted on the rearwardly disposed run of chain 26. The rear run of chain 26 passes through opening 64, as shown in FIG. 2, in the bell crank arms 59 and 60.

My invention operates in the following manner. As a float 16 rises on a wave 12, its associated weight 39 holds the end of chain 26 so that pulley 40 turns as pawl 45 allows rachet 44 to rotate freely. DUring this time, pawl 28 locks rachet 29 and thereby pulley 25 to hold weight 27 at whatever height it may be. As a float 16 falls on a wave 12, pawl 45 locks pulley 40 so that the falling float 16 raises weight 27 while pulley 25 turns freely as pawl 28 allows rachet 29 to turn. In this manner wave action raises the weights 27.

When a weight 27 reaches a given height, cam block 63 presses down on bell crank arm 59 to move rod 50 to the right as shown on the right side of FIG. 1. This disengages both pawls 28 and 45 to drop weight 27. As shown in FIG. 3, the dropping of a weight 27 rotates pulley 25 counterclockwise to cause pawl 36 to rotate shaft 19 and thereby drive generator 24. When a weight 27 falls to a given lower position, its associated cam block 63 lifts the arm 60 of bell crank 54 to move rod 50 to the left and again engage the pawls 28 and 45 so that wave action will again raise the weight 27. As can be inferred from the foregoing, the total weight of the float 16 must be greater than the difference between the weights 27 and 39 associated therewith. With a large number of units between pairs of legs 13 and 14, a weight 27 will always be falling to provide a constant power output.

While a generator 24 is shown, any other use for the shaft power may be made. While a given mechanism for the release of the rachets is shown, any equivalent may be used. While a chain passing about and engaging pulleys is described, any equivalent may be used. Although the best known form of this invention is shown and described, it will nevertheless be understood that this is purely exemplary and that modifications may be made without departing from the spirit and scope of the invention.

I claim:

1. A power source powered by waves comprising, in combination, a frame having a plurality of pairs of legs extending into water and having a top member fixed to the upper ends of said legs, a horizontal shaft journalled in said frame above the water, a first pulley rotatably mounted on said shaft between each pair of said legs, a first releasable rachet mechanism preventing rotation of each of said first pulleys in a first direction, a nonreleasable rachet in each of said first pulleys driving said shaft when each of said first pulleys is rotated in the other direction, a chain hanging over and engaging each of said first pulleys and having first and second ends, a first heavy weight fixed to the first end of each of said chains urging rotation of said first pulleys in the first direction, a float constrained to rise and fall on waves between each pair of legs, a second pulley rotatably mounted on each of said floats, said second pulleys each engaging the second end of one of said chains, a second releasable rachet mechanism on each of said second pulleys allowing rotation of said second pulleys when said floats on which said second pulleys are mounted rise on waves, a second lighter weight at the second end of each of said chains below said floats so that rising and falling of said floats raises said first weights, and means sumultaneously releasing both of said releasable rachet mechanisms associated with each of said first weights when said first weights are raised to a given height to drop said first weights and rotate said shaft by means of said non-releasable rachets, said means releasing said releasable rachet mechanisms allowing said releasable rachet mechanisms to engage when said first weights fall a given distance.

2. The combination according to claim 1 wherein each of said second pulleys is centrally mounted on one of said floats, wherein each of said floats contains a vertical passage, and wherein the second end of each of said chains makes a turn about one of said second pulleys and then extends through a passage in one of said floats.

3. The combination according to claim 2 with the addition of a generator on said top member, and transmission means connecting said shaft to said generator so that said shaft drives said generator providing power.

4. The combination according to claim 3 wherein each of said first and second rachet mechanisms have first and second rachets and first and second pawls associated therewith, said means releasing said first and second rachet mechanisms raising said first and second pawls from said first and second rachets.

5. The combination according to claim 4 wherein said means raising each of said first and second pawls is a pair of bell cranks associated with each of said chains and being mounted on one of said legs of each of said pairs of legs, said bell cranks each having an arm containing an opening through which one of said chains extends, a cam block on each of said chains between a pair of said bell crank arms, a laterally moveable rod connected to said bell cranks, a first laterally slidable release rod having a cam face and being connected directly to each of said laterally moveable rods, said cam face of each of said first release rods lifting one of said first pawls, and a second laterally slidable release rod having a cam face each being mounted on one of said floats, said cam face of each of said second release rods lifting one of said second pawls, each of said second laterally slidable rods having a ring through which one of said laterally moveable rods passes, said rings moving up and down about said laterally moveable rods as said floats are moved up and down by waves.

* * * * *